G. W. HILDRETH.
Grain-Drill.
No. 19,423.
Patented Feb. 23, 1858.
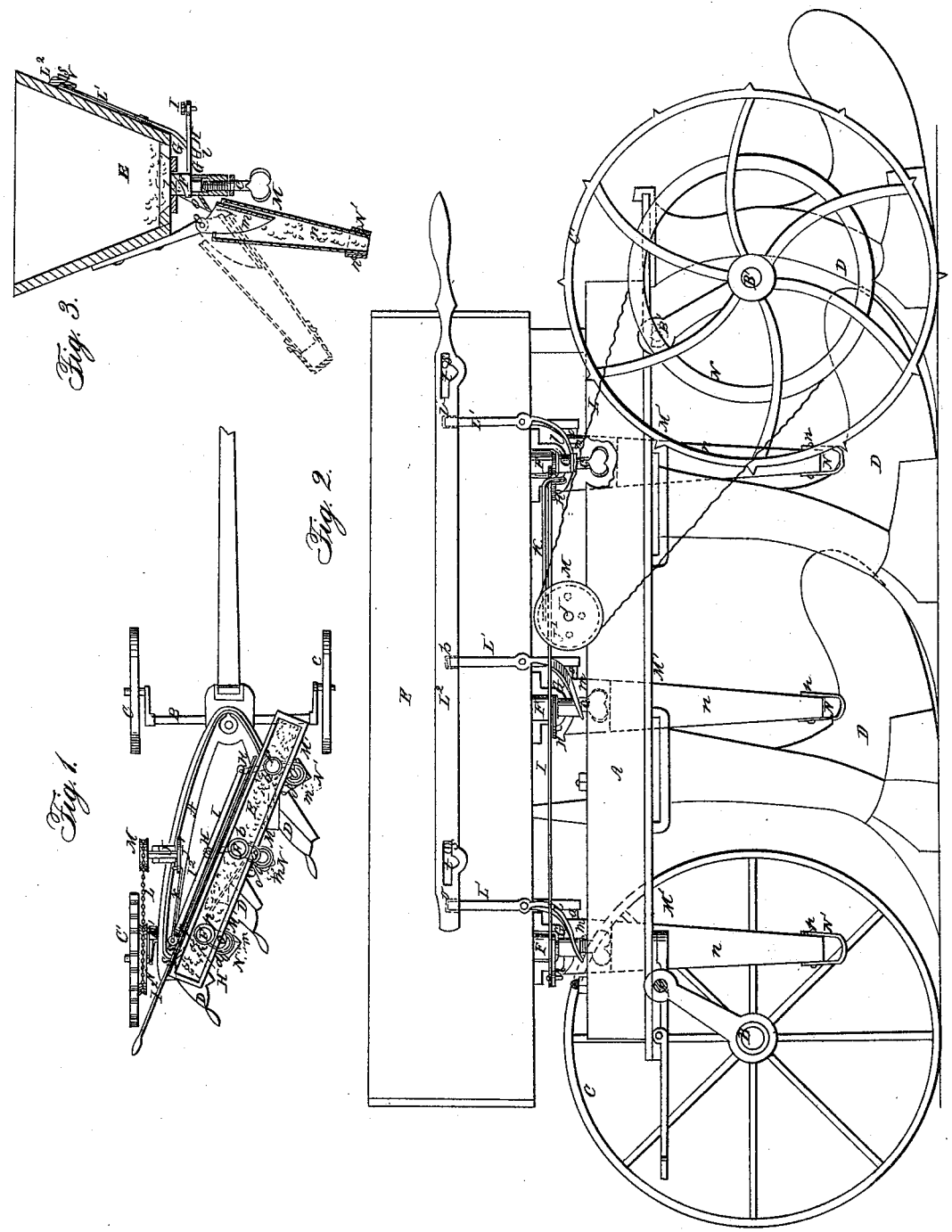

UNITED STATES PATENT OFFICE.

G. W. HILDRETH, OF LOCKPORT, NEW YORK.

IMPROVEMENT IN SEEDING-MACHINES.

Specification forming part of Letters Patent No. 19,423, dated February 23, 1858.

*To all whom it may concern:*

Be it known that I, G. W. HILDRETH, of Lockport, in the county of Niagara and State of New York, have invented a new and useful Improvement in Constructing and Applying Seed-Distributers to Gang-Plows; and I do hereby declare that the following is a full, clear, and exact description of the same, reference being had to the accompanying drawings, forming part of this specification, in which—

Figure 1 is a plan, Fig. 2 a side elevation, and Fig. 3 a transverse section, of my improvement.

Similar letters of reference in each of the several figures indicate corresponding parts.

The nature of my invention consists in providing on the gang-plow frame an oblong hopper having a seed-distributer arranged under the discharge-passages of its bottom, consisting of a cylindrical plug made inclined on its upper end and capable of turning horizontally and playing up and down vertically, and is combined with the propelling-wheel of the plow and a hand-lever, in the manner and for the purpose hereinafter described.

To enable others skilled in the art to make and use my invention, I will proceed to describe its construction and operation.

A is the gang-plow frame, made of trigonal form, and resting upon two crank-axles, B B′, which rest on three wheels, C C C′, and are capable of being raised and lowered in a manner to regulate the depth of the plowshares D D D.

E is the hopper. It is set diagonally upon the frame A, so that the seed-distributer shall stand in proper relation to the shares D D D.

F F F are the seed-distributers, each of which consists of a cylindrical plug made slightly concave and inclined on its upper end, in order that it shall receive the seed and automatically discharge it into the seed-conducting tube. These distributers are fitted loosely, so as to turn and rise and fall in metal boxes G G G, which are screwed fast to the bottom of the hopper directly under the discharge-passages $b\ b\ b$.

$c\ c\ c$ are set-screws, on which the distributers rest, and by which they are raised and lowered to a greater or less extent when it is desired to regulate the feed or increase or lessen the size of the space between the upper end of the distributer and the bottom of the hopper.

H H H are horizontal arms cast on the distributers, and extending out some distance from under the bottom of the hopper.

I is a bar which combines the distributers with one another and causes them all to oscillate together, but allows of either of them being disconnected when desirable.

J is a shaft turning in bearings on top of the frame A, and having a crank-plate, J′, on its inner end.

K is a pitman or connecting-rod, leading from the front end of the bar I to the crank-plate J′, as shown.

L is a chain leading from a pulley, M, on the crank-shaft to a pulley, N, on the rear driving-wheel. Thus combining the distributers with the propelling-wheels enables one to give them a vibratory circular motion, and thus effect a more perfect discharge of the seed without any liability of mashing or breaking it. The crank-plate J′ may have a series of holes for the pin of the pitman, and the length of the stroke given to the distributers and the amount of feed in a measure regulated thereby without operating the set-screw.

L′ L′ L′ are upright levers, having each a horizontal foot, $l$, which stands under the arm of the distributers, and as the levers are moved back and forth exerts upward pressure upon the same and causes the distributers to rise and shut off the discharge of the seed.

$L^2$ is a bar which combines the levers L′ L′ L′ and causes them to operate together. This bar has recesses $v$ formed in it to receive the end of the levers, and is attached to the side of the hopper by screws $s\ s$, which play freely in slots $t\ t$, in order that the bar may be moved back and forth and the levers L′ operated and the distributers raised and lowered thereby.

M′ M′ M′ are the seed-conducting tubes. Each of them is made in two parts, $m\ n$, the upper part, $m$, being hinged loosely to a vertical bar, which is screwed to the hopper, as shown at $o$, so as to swing in and out or up and down, and the lower part fitted loosely over the upper part, so as to turn on it.

N′ is a shoe hinged on the lower end of the seed-conducting tube, as shown at $p$.

O is an apron or spout cast on each of the boxes G for the purpose of guiding the seed from the distributer to the seed-conducting tube, as illustrated.

Having the seed-conducting tube hinged as just described is very essential in a gang-plow while planting hillside land, as it becomes necessary to change the angle at which it stands under such circumstances, in order to have it conduct the seed into the furrow. Providing the shoe on the end of the tube and having the tube to turn and swing up and down enables me to plant the seed either broadcast or in drills, for by simply turning down the shoe, as shown in red, the seed will fall upon it and be distributed through two openings and spread like broadcast sowing, and by simply turning up the shoe again the seed will fall directly to the ground and be planted in drills; and by having the shoe turned down and the tube moved round so that the openings of the shoe shall stand a little fore and aft, or in range with the upper edge of the mold-board, the seed will be discharged in a manner to cover the whole surface completely.

Operation: As the plow moves forward the rear propelling-wheel communicates an oscillating circular motion to the distributers, through the intermediate connections, and the seed in the hopper agitated and caused to run down off the inclined end of the distributers into the conducting-tubes, and from thence into the soil, either in drills or broadcast, according as the shoe on the end of the tube is adjusted. To stop the planting operation, the driver lays hold of the bar and moves it backward, and to proceed again with the said operation he shoves it forward to its original position. If it is desired to increase the feed materially, the set-screw is turned in a manner to lower the distributer, and vice versa if it is desired to decrease the feed; but if it is only desired to change the feed slightly it is effected by altering the length of the crank. To disconnect either of the distributers, the pitman is detached from the arm H and the set-screw turned in a manner to raise the distributer and cause it to plug up the discharge $c$ of the hopper.

With my improved distributers applied to a gang-plow every kind of seed—even oats—can be sown regularly and surely without being bruised or mashed, and with the improved tubes level, undulating, and hillside land can be planted with the greatest accuracy in any manner desired.

One great advantage of sowing seed with the gang-plow and covering as fast as you sow is the seed are all put in the ground the same depth or on the same level, as the plows all cut the same depth, and the seed drops in the furrows while open, and the furrow-slice is then turned onto the seed, covering every seed completely and of uniform depth, except as you may leave the surface a little uneven, and no shower has a chance to work the seed to the surface, as when sown broadcast by hand in the ordinary manner.

What I claim as my invention, and desire to secure by Letters Patent, is—

The combination and arrangement of the car $L^2$, levers $L'$, horizontal feet, and set-screws $c$ with the cylindrical seed-distributers F, the whole being constructed, arranged, and operated in the manner herein described and for the purpose set forth.

G. W. HILDRETH.

Witnesses:
  W. C. House,
  Joseph Clark.